Nov. 11, 1952 W. J. KINDERMAN 2,617,300

FLOWMETER

Filed Nov. 29, 1946 7 Sheets-Sheet 1

Inventor
Walter J. Kinderman
by [signature]
Attorneys.

Nov. 11, 1952 W. J. KINDERMAN 2,617,300

FLOWMETER

Filed Nov. 29, 1946 7 Sheets-Sheet 2

Inventor:
Walter J. Kinderman.
by [signature]
Attorneys

Nov. 11, 1952 W. J. KINDERMAN 2,617,300

FLOWMETER

Filed Nov. 29, 1946 7 Sheets-Sheet 3

Inventor
Walter J. Kinderman
by [signature]
Attorneys.

Inventor
Walter J. Kinderman
by [illegible]
Attorneys.

Inventor
Walter J. Kinderman
by [signature]
Attorneys.

Nov. 11, 1952 W. J. KINDERMAN 2,617,300

FLOWMETER

Filed Nov. 29, 1946 7 Sheets-Sheet 6

Fig. 17.

SHOWING MAGNETIC MOMENT ARMS WITH RESPECT TO SPIRAL ARMATURE SECTIONS IN THE MAGNETIC GAP

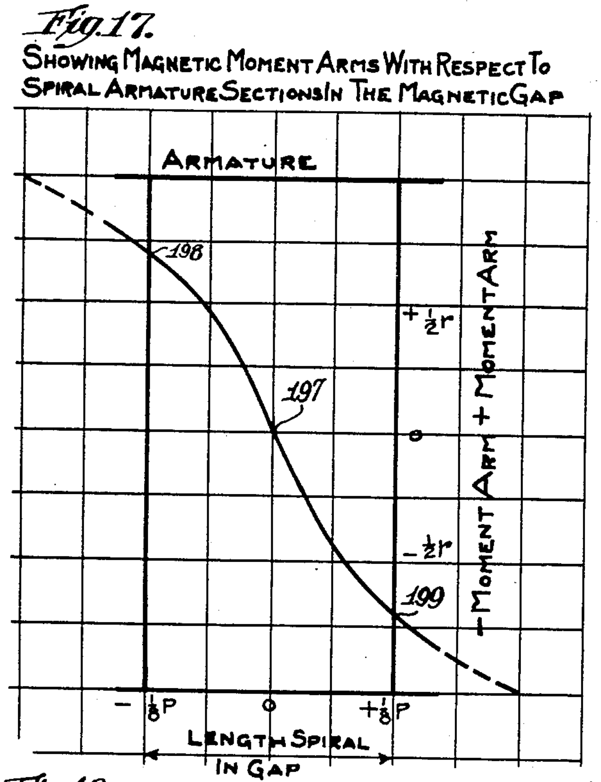

Fig. 18. EQUILIBRIUM POSITION

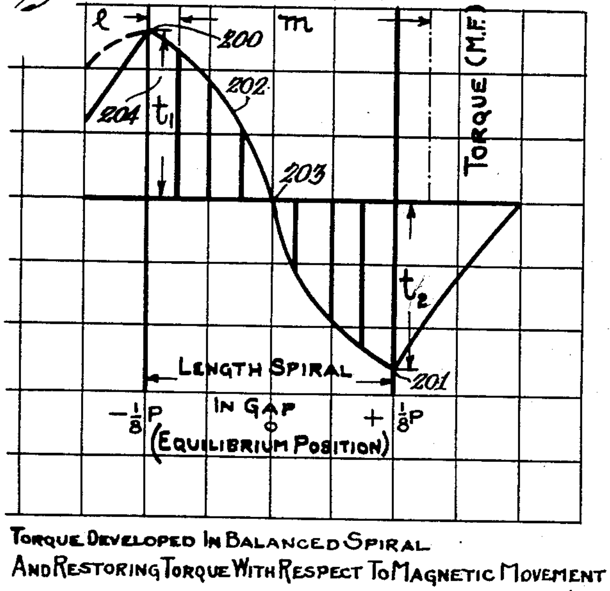

TORQUE DEVELOPED IN BALANCED SPIRAL AND RESTORING TORQUE WITH RESPECT TO MAGNETIC MOVEMENT

Fig. 19.

MAGNETIC MOVEMENT IN TERMS OF SPIRAL ARMATURE PITCH

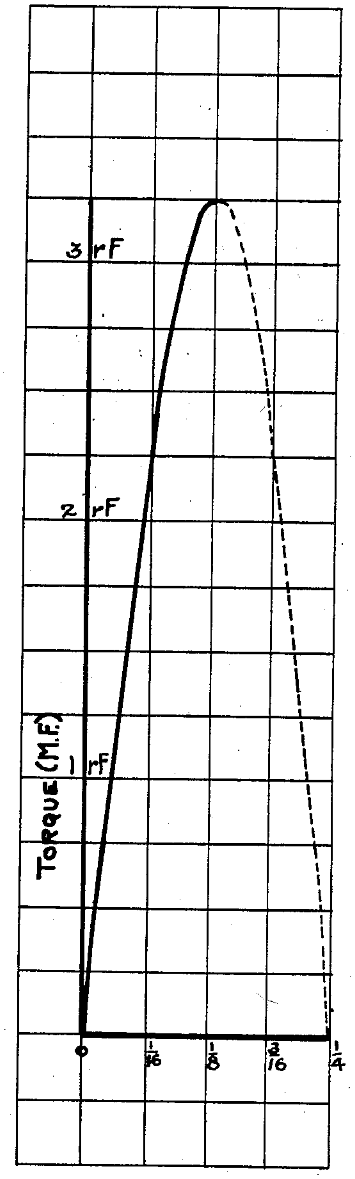

Inventor
Walter J. Kinderman
by [signature]
Attorneys.

Inventor
Walter J. Kinderman
by [signature]
Attorneys.

Patented Nov. 11, 1952 2,617,300

UNITED STATES PATENT OFFICE 2,617,300

FLOWMETER

Walter J. Kinderman, Philadelphia, Pa., assignor to Yarnall-Waring Company, Philadelphia, Pa., a corporation of Pennsylvania Original application January 6, 1944, Serial No. 517,242. Divided and this application November, 29, 1946, Serial No. 713,035

3 Claims. (Cl. 73—211)

My invention relates to means and methods for transmitting longitudinal motion within a weir chamber or orifice subject to pressure into rotary movement outside the chamber through a pressure resistant wall.

A purpose is to operate an indicator or recorder from a weir or orifice by a spiral magnetic armature through movement of a magnet along the length of the armature.

A further purpose is to provide spiral connection between a pressure-responsive element such as a diaphragm, bellows or float, responding to a characteristic such as liquid flow or level in a weir or orifice, and an indicator through a magnet and magnetic armature, geared together magnetically to produce a result similar to worm and worm gear connection.

A further purpose is to use difference in pressure, such as characterizes difference in water levels in a weir or the like or is present on opposite sides of an orifice in a flow meter, for example, to shift the position of a magnet along the length of a rotary spiraled magnetic armature and to show angular movement of the armature upon an indicator.

A further purpose of the invention is to apply magnetic linkage between a magnet preferably of horse-shoe type movable, in response to a liquid characteristic in a weir or orifice, transversely to its flux and a rotatable spiral armature of magnetic material between the poles having its axis longitudinal to the direction of motion to secure rotary motion of the armature and connected parts. This is particularly useful because the magnet coupling is resilient and because it operates through pressure-resistant walls so that the magnet can be subject to pressure and the armature free from pressure.

A further purpose is to provide effective and accurate connection between a pressure-sensitive element subject to differing pressures, one varying because of different water levels or both due to flow meter pressure drop, for example, and to indicate magnet movement through rotary armature actuation.

A further purpose is to provide effective and accurate connection between a pressure-sensitive element, subject to variable heads or to the two pressures on opposite sides of an orifice, and an indicator, while avoiding stuffing box friction and other friction.

Further purposes will appear in the specification and in the claims.

I have preferred to illustrate my invention by a few forms only, selecting forms which are simple, practical, reliable, effective and inexpensive and which at the same time well illustrate the principles involved.

The invention resides not only in the methods or processes which I apply, but in the mechanism by which the methods or processes may be carried out.

Figure 1a is a fragmentary section applying, to the structure of Figure 1, a modified form of pressure-responsive element.

Figure 1b is a reduced scale fragmentary illustration of a form modified as compared with Figure 1.

Figure 2 is a reduced scale section of Figure 1, taken on line 2—2 of Figure 1.

Figure 3 is a reduced scale perspective view of a portion of the structure of Figure 1, capable of use also with the structure of Figure 1a.

Figures 11, 11A, 12, 12A, 13, 13A, 20:
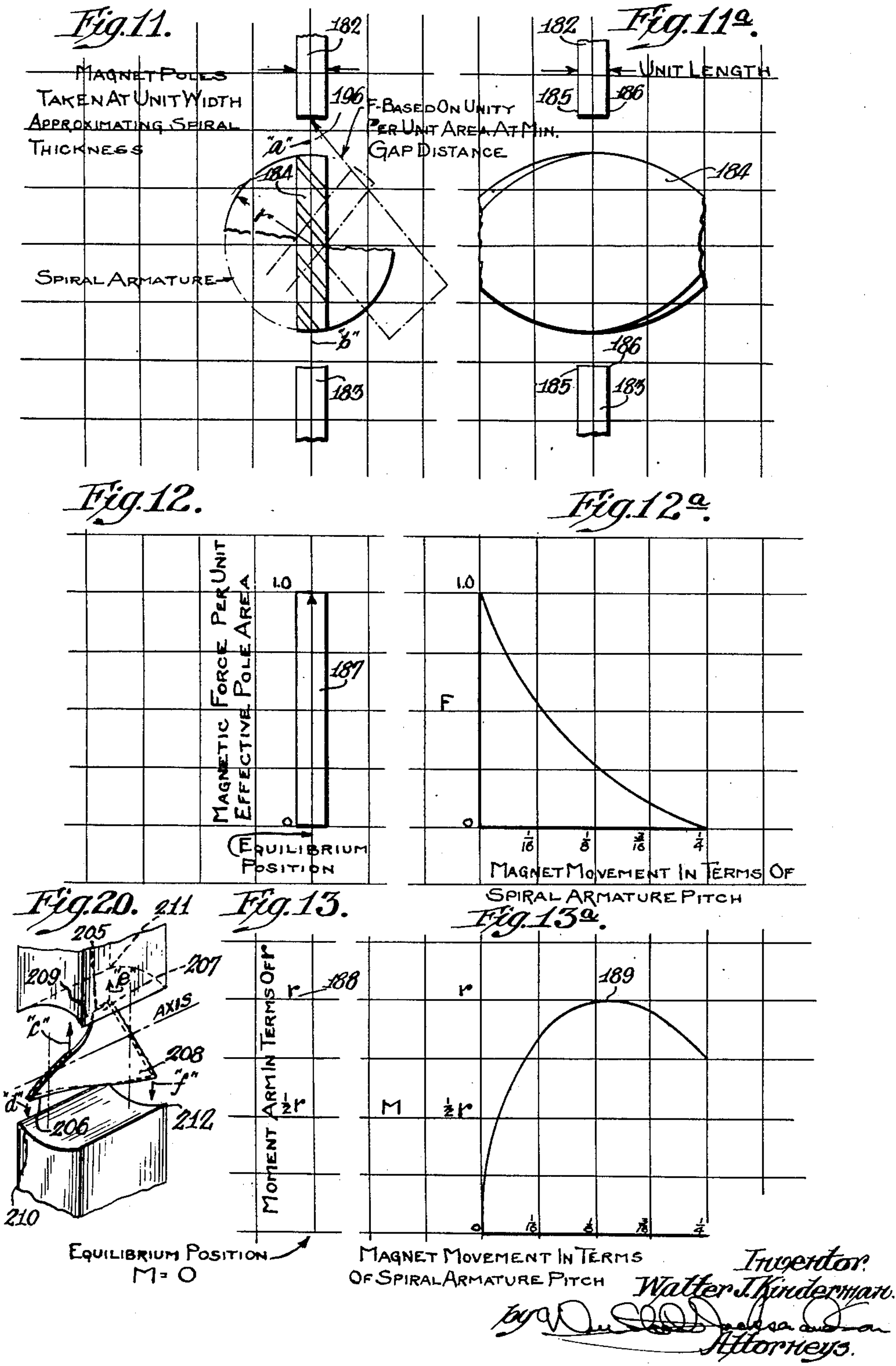

Figures 11, 11a; 12, 12a; 13, 13a and 14, 14a are schematic figures arranged in pairs and illustrating conditions concerning the poles and the spiral armatures as they apply to previously existing structures.

Figures 15, 15a and 16, 16a are corresponding pairs of schematic views relating to the present invention.

Figures 17, 18, 19, 20 are schematic views showing relations existing between the poles and the armature in the present invention.

The present application is a continuation in part of applicant's previous application, Serial No. 388,134, filed April 11, 1941, now abandoned, and a division of applicant's previous application, Serial No. 517,242, filed January 6, 1944, for Differential Pressure Gauge, which matured into Patent Number 2,509,644 on May 30, 1950.

The pressure sensitive element in some of the forms uses a pressure area or surface which is exposed to fixed and variant opposed (hence differential) pressures from a weir, orifice or the like. It acts against a restraining force which increases uniformly with progressive displacement of the pressure area.

The preferred form among those shown in a diaphragm subject to the opposing pressures, using a flat cantilever spring as the restraining force.

It is evident that various other forms will carry out my broad invention and I have illustrated several.

A metal bellows (Figure $1^a$) of spring material of proper proportions could be used instead of the diaphragm.

A magnet float within a mercury pool is cheap and effective, part of the pool being subject to one of the differential pressures and part exposed to the other pressure.

Figure 1:
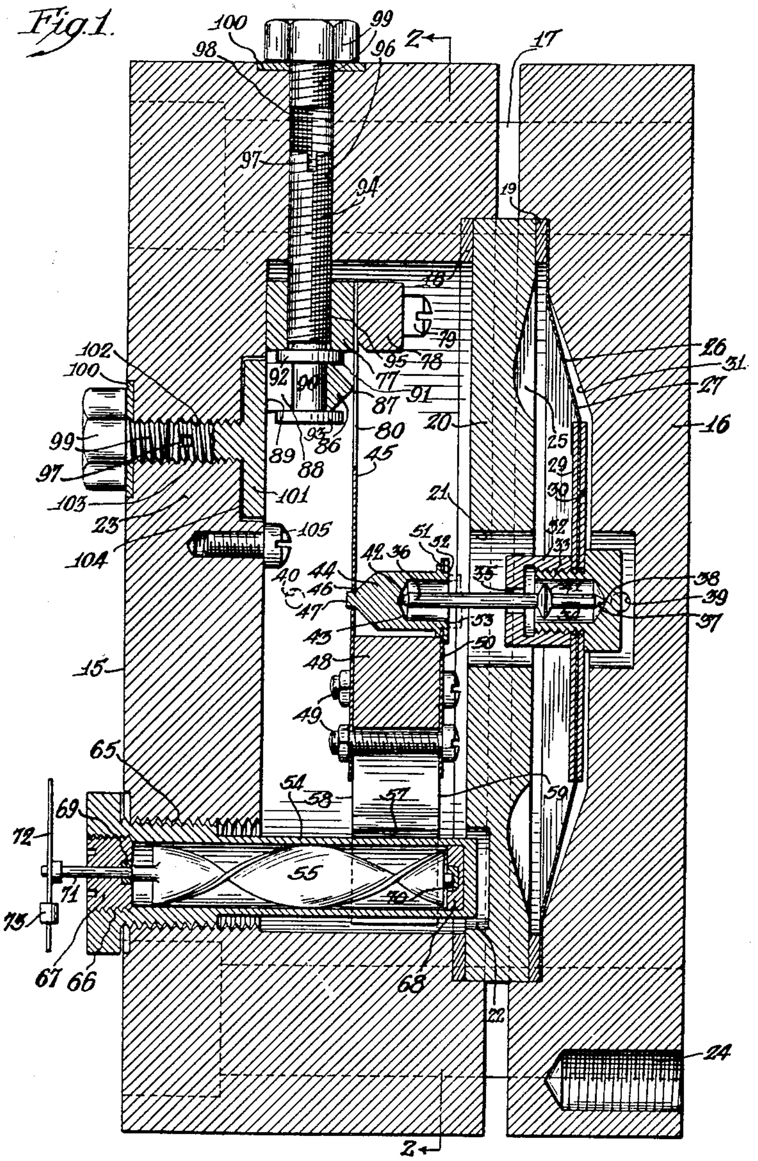
Figure 1 is a central vertical section of a preferred form of the indicating element of my invention.
Figures 1A, 1B, 2, 3:
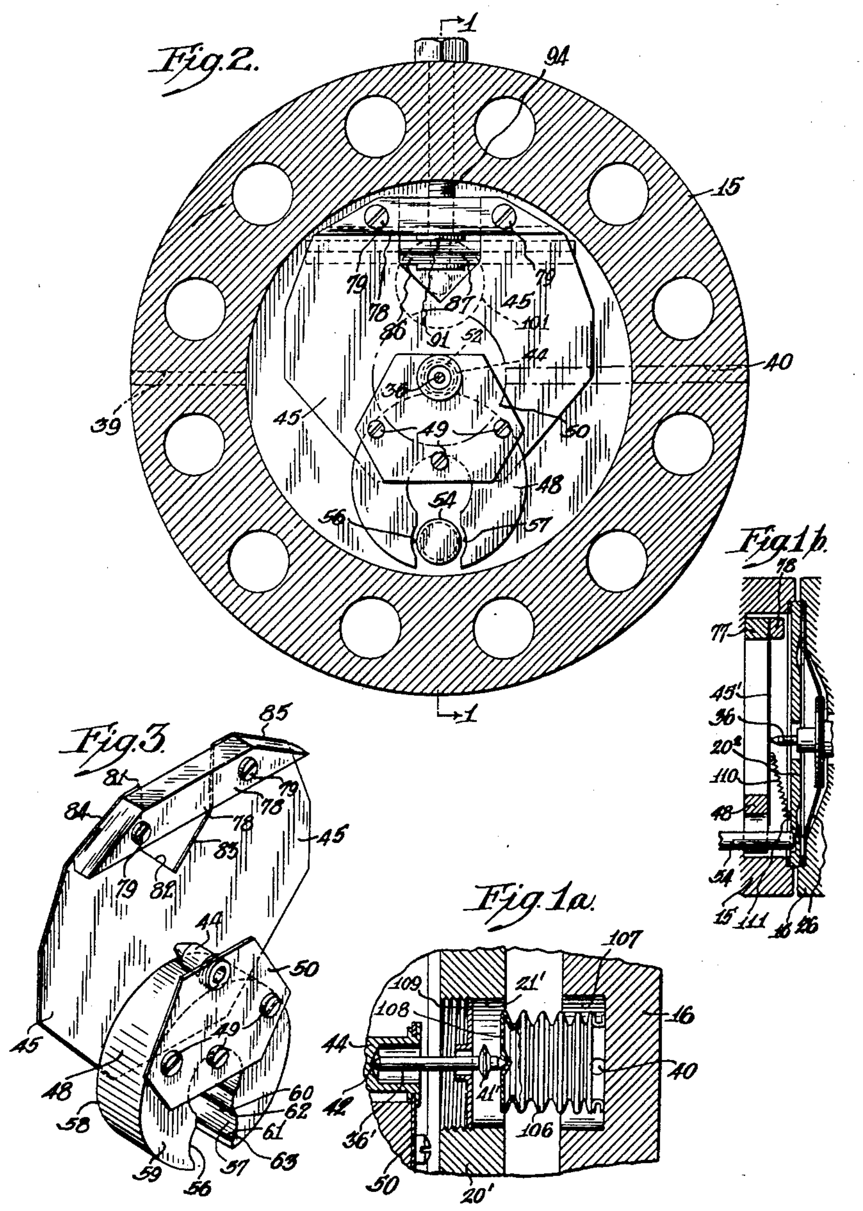

The operating mechanism for my preferred form of indicator, that of Figures 1, 2 and 3 is enclosed within a housing 15 and cover 16 united by bolts 17 and sealed by annular packing 18, 19 lying on opposite sides of a diaphragm support 20 apertured at 21.

The diaphragm support for convenience is recessed at 22 on the side toward the housing body 23 in order to permit a well, later described, to fit down into the recess.

Because the liquid whose flow or level is to be indicated does not enter the housing but produces its effect in alteration of effective pressure to be exerted upon the diaphragm through fluid piped to the housing from a distance, there is no requirement that the housing be placed in any particular position with respect to the vertical or horizontal. It is therefore assumed to be mounted vertically from any suitable bracket by a bolt entering threaded opening 24. This corresponds with the showing in Figure 1. The indicator used may therefore be attached to the front face of the housing where it can be seen to the best advantage. With this arbitrary position for the gauge the parts will be considered conveniently as outer and inner, upper or lower, according to their relation in Figure 1.

On the inner side of the diaphragm support, toward the cover, the support is annularly recessed at 25 to permit collapse into the recess of an annular transversely free flexible diaphragm portion 26 of a diaphragm 27. The diaphragm is held at its outer edge by the packing 19 which protects against leakage between the diaphragm support and the cover.

At its center the diaphragm is stiffened and supported to move as a unit, by diaphragm plates or heads 29 and 30 which are fastened together. The cover is concaved at 31 to give room for the diaphragm and its plates within the cover.

The plates are held to the diaphragm on opposite sides between members 32 and 33, threaded together. One of the members is cupped at 34 for convenient application to it of a desirable form of thrust connection between the diaphragm and parts which are to be moved by it. As in the case of most of the structures, various forms of carrying out my functions are available.

In the thrust transmission shown, the clamp member 32 is apertured at 35 for passage of a pin 36 and the clamp member 33 is coned concavely at 37 to form a pin bearing support for the end 38 of the pin 36.

The diaphragm is subjected to differential pressure on opposite sides through pipes 39 and 40 which may represent differences in fluid level, or in pressure or opposite sides of an orifice, or flow over a weir, for examples.

The pressure upon the inner face, adjacent the cover, is a standard pressure in the liquid form, shown equal to or greater than the pressure attained due to the highest level of liquid to be indicated.

The pin 36 carries a collar at 41 in order to prevent accidental withdrawal from the clamping members through aperture 35. At the other end the pin 36 is pointed at 42 to engage within and form a pin bearing with a concavity 43 in a thimble 44 which engages with the spring 45. The end 46 of the thimble passes through an aperture of the spring and may be peened at 47 to place against the spring to hold the parts together. Peening is not necessary because the parts are under compression.

Whatever the form of connection between the pressure sensitive device (diaphragm) and the magnet, the spring makes a very convenient support for the horseshoe magnet 48 and supplies effective retardation for the movement of this magnet.

Where the thimble and pin connection are used, the support of the thimble from the spring and the mounting of the horseshoe magnet may be stiffened and reinforced by holding the horseshoe magnet to the spring by the same bolts 49 which fasten a plate 50 upon the under side of the magnet, thus uniting the thimble and plate 50. When this is intended the thimble is flanged at 51 to engage the plate about an opening 52 through which the rear end 53 of the thimble passes. This rear end of the thimble is constructed initially in the shape seen in dotted lines. After it has been passed through the opening it is peened over against the plate in the position shown.

By whatever means the magnet 48 is shifted transversely with respect to its planes and to its lines of flux, whether by a pressure-operated diaphragm or bellows, for example, or as by a float, the means for transmission of the response of the pressure-sensitive element consists basically of passing magnetic flux from a permanent magnet, subject to pressure through a pressure wall or well 54 to a magnetically susceptible rotatable follower, or armature 55 which is "external" in the sense that it is free from pressure but at the same time is responsive rotarily to movement of the magnet parallel to the axis of the follower and within the pressure chamber.

More specifically, the magnetic transmission is based on change in reluctance of the magnetic circuit with movement of the magnet at right angles to its flux and along the axis of the armature, accompanied by rotary reaction of the armature to the magnet movement to essentially re-establish the reluctance of the magnetic circuit at a balanced position which is thus maintained as a constant.

It is important that the magnetic reluctance for the balanced position of the armature through the range of movement of the pressure sensitive element remains essentially constant in order to avoid the effect of unbalanced magnetic forces upon the indication.

The magnet is a permanent magnet of material capable of holding its magnetism over prolonged periods of time without change. Its poles 56 and 57 are shown as curved to partly inclose the walls of the well but, where the magnet is canted during its movement along the axis of the armature, the magnet poles must have clearance from the armature sufficient so that the poles will not touch the walls of the well when the magnet has been shifted along the armature axis.

Pole faces have been used successfully which are not curved.

Necessarily with lateral movement of the magnet in the form of Figures 1 to 3 the spring mount in tilting about a fulcrum will cant the magnet so that its outer and inner surfaces 58 and 59 will no longer be parallel to their positions as seen in Figure 1 and the center line between the poles parallel to their curved surfaces will no longer be parallel with the axis of the armature 55 and of well 54.

In order to give sufficient clearance various means may be used. The total clearance may be made large, or the edges of the poles at 60 and 61 may be relieved to permit this canting with close clearance, or the faces 62 and 63 of the poles may be relatively flattened so as not to present true cylindrical surfaces. The poles may terminate in parallel spaced plane surfaces. Whatever the means used for insuring clearance, when the magnet tilts as it moves, the poles should be free from contact with the well, throughout the intended range of magnet movement.

While, as suggested, magnets with parallel plane pole surfaces of uniform cross-section may be used with the well located directly between them and with high flux density better results in most cases are obtained with magnet poles shaped to conform as nearly to the well as the law of movement of the magnet will permit and without contact with the well. It is also desirable to keep the clearance as uniform as possible throughout the range of motion of the magnet.

Any good magnetic alloy which is capable of holding its magnetism well can be used for the magnet. Good results have been secured by the use of a cast magnetic material known as "alnico." Of course any electromagnet may be used to serve instead of the permanent magnet but practical difficulties of connection, and particularly that it is dependent upon an outside current source, makes this undesirable. With higher flux densities, smaller magnets may be used.

The magnet movement is desirably as nearly as possible parallel to the axis of the armature and to the axis of the well in order that the clearance of the magnet poles from the well may be made and maintained as small as possible. In such a form as that of Figure 1, with a support which bends about the fulcrum of a spring, the magnet will travel through a curved path determined by the position of the fulcrum and the approach which the bend of the spring about its fulcrum affords to true swinging movement about an axis in the fulcrum.

The armature comprises a spirally twisted strip made of flat magnetically susceptible material as close fitting to the well as possible without contact of the edges of the spiral with the interior walls of the well, in order that this material may as nearly as possible completely span between the two magnet poles. The magnetically susceptible material is referred to herein variously as "magnetizable" and "magnetic."

The well is threaded at 65 into the housing. It is also threaded internally at 66 and is closed at the outer end by a plug 67. Within the plug 67 and within an insert plug 68 at the bottom of the well are located jeweled bearings 69 and 70. The plug and the bearing 69 permit passage through the plug and outer bearing of a shaft 71 rigid with the armature and carrying a pointer or needle 72, counterbalanced by weight 73.

It is necessary, of course, to adjust the indication or recording position to the actual liquid conditions of water level or flow.

Because the gauge depends for its operation upon a higher standard pressure or higher variable pressure with a lower variable pressure, the standard high pressure where present is used as the zero point to which the setting of the zero position of the spring in Figures 1, 2 and 3 is related. For this reason the standard pressure or higher variable pressure is introduced to the right of the diaphragm in Figure 1 and the variable lower pressure is introduced to the left of the diaphragm in Figure 1.

With a longer pitch the range of movement of a needle 72 is reduced for any given movement of the magnet along the axis of the armature, whereas with a shorter spiral pitch the corresponding range of angular movement and of movement of the needle 72 about its scale is increased. Of course the calibration of the scale must be suited to the movement provided.

Figure 9:
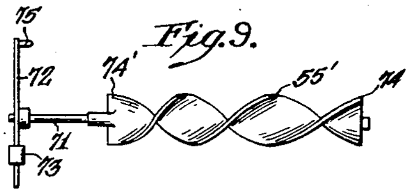
Figure 9 is a side elevation or top plan view of one of many possible forms of follower or armature to correct in the armature where the variation in rate or quantity of flow or other liquid characteristic is not the same at all parts of the armature for equal movements of an operating magnet. This may be applied to any of the forms, particularly Figures 6 or 7.

The scale may be calibrated to suit any unusual or irregular needle or pen movement by which it differs from angular movement truly proportional to the change in liquid level or change in rate of flow. In Figure 9 I indicate a correction of the armature movement by variation of the spiral pitch from a true spiral of uniform pitch, and this is intended to apply to any of the forms.

Assuming that the rate of flow through a meter or weir, orifice or Pitot tube type, for example, is being indicated or recorded, the need for calibration differently than a uniform calibrated scale may be eliminated or greatly reduced by progressively shortening the pitch of the spiral for the weir type or progressively lengthening the pitch in the orifice or Pitot tube type with respect to liquid level or pressure variation in the particular meter selected. Where the flow varies with the 5/2 or 3/2 power with respect to the liquid level, according to the weir notch used, the pitch of the spiral will be reduced progressively to correspond so as to cause an increasing movement of the needle or recording pen for each successive equal increment of rise in liquid level.

Many examples might be cited where, unless corrected, the needle movement per unit of pressure difference would vary from uniform movement.

Variation of spiral pitch from uniform pitch to correct the movement of an indicating needle or recording pen responsive to differences in pressure in a flow meter on opposite sides of an orifice takes care of variation between the two pressures which may both be variable.

In Figure 9 the magnet follower or armature

55' progressively reduces in pitch from the inner end 74 to the outer end 74' and the recorder pen 75 is correspondingly accelerated in angular movement when the magnet moves along the follower in this direction with increasing liquid levels or pressure differences.

With orifice flow the armature would be altered in pitch reversely to what is shown in Figure 9, the pitch progressively lengthening from the right to the left as distinguished from the showing in Figure 9, to take care of the square root function applying to orifice flow.

The zero point of the indicator needle or recording pen can be adjusted by turning the needle or recorder to zero at zero position of the magnet and setting the needle or pen at its zero by a set screw 76 bearing against shaft 71.

The jewel mounting of the spiral armature permits practically frictionless rotation of the armature about its axis, which is the axis of the well and in practice no difficulty has been found in securing sufficient angular extent of rotation for direct reading, avoiding the friction and lost motion which would be introduced by insertion of gearing to multiply in needle or pen movement the angular movement of the armature.

The armature is preferably of soft iron or low carbon steel. Excellent results have been secured with Swedish iron and with so-called "core" iron having high permeability, low reluctance and low hysteresis. An annealed low carbon iron or steel of commercial grade can be used. The armature will operate even when it in itself constitutes a spiral magnet but will not operate as satisfactorily as when it is made of soft iron.

The well is of nonmagnetic material. Silicon bronze has given good results.

The section of the spiral within the well which is directly between the poles of the magnet becomes part of the magnetic circuit, the reluctance of which depends upon the angular relation with respect to the poles of that part of the spiral within this range of magnetic influence, i. e. the phase relation of the spiral to the flux at which the delicately mounted armature comes to rest. Since the spiral is free to turn, lowest and essentially constant reluctance considerations cause the spiral to assume a position of lowest reluctance to the magnetic field. Whatever position the magnet poles assume along the axis of the armature, the lowest energy relation of the spiral section between the poles will be the same lowest energy relation and the same phase relation, i. e. the same as that in the initial position of the magnet. Assuming that this always corresponds to alignment of the spiral section at the magnet pole centers with the flux, this will result in such rotation of the armature for any magnet movement that the armature length between the poles will correspond angularly to that seen between the poles in Figure 1.

Where the armature pitch is uniform, as in Figure 1, the relation of the spiral to the magnet will be constant, i. e. the armature will rotate equally for each increment of magnet movement causing angular rotation of the armature and hence of the indicator or pen to equal extent for equal ranges of movement of the magnet along the armature axis.

The method of transmission of movement of the diaphragm or other pressure-sensitive element into rotative effect upon the indicator results in the transformation of a comparatively small transverse motion of the pressure-sensitive element into a large angular motion of the spiral and attached pointer or recorder, with an accuracy and reliability quite comparable with that which could be secured if the armature and magnet were coupled mechanically as a worm and worm gear, but free from gear friction and free from stuffing box requirements between the pressure chamber and the indicator.

Basic design considerations indicate that the relation of spiral pitch to magnet thickness should be relatively high. A 4 to 1 relation gives good results and 3 to 1 gives quite acceptable performance. The ratio of spiral strip thickness to width is not so critical but does affect sensitivity, torque and hysteresis effects. Thin strip spirals show superior sensitivity and lower hysteresis lag while thicker strips show less sensitivity and higher hysteresis lag but with a slight gain in maximum obtainable torque values.

Other forms of adjustment for zero position and for range of indication previously referred to are based upon the mounting and shape of the spring 45, i. e. upon controlling the initial restraint and the variation in restraining force with displacement of the pressure area of the pressure-sensitive element, as applied to the particular type of restraint selected in Figure 1. In the present construction this is accomplished by positioning an adjustable fulcrum support (edge) against a flat restraining spring such as that of Figure 1.

Movement of the fulcrum edge normal to the plane of the spring controls the zero setting, while movement of the fulcrum edge along the surface of the spring parallel to the spring length changes the unsupported spring length and therefore the deflection characteristics. This is equivalent to calibration for range of liquid level travel or range for a given indication.

Space limitations require a special design of the flat spring to obtain the adjustment range desired within permissible spring stresses. The spring material must be corrosion-proof and free from creep, fatigue and appreciable elastic hysteresis. Good results are obtained with heat treated beryllium copper.

The spring 45 is supported at its rear end between a transverse block 77 and its cap 78, both held to the body of the housing by bolts 79.

If the supporting spring were the same thickness and width throughout its length the possible adjustment in range of movement due to fulcrum adjustment would be relatively small, whereas it is desirable to have the construction cover a range of level difference up to two or more feet. To increase the effect of change in fulcrum the spring can be varied in thickness, or, as is here more convenient and desirable, in the effective width where the spring is bent, i. e., at the fulcrum.

In order to accommodate a wide difference in range, the supporting flat spring is wide and is slotted at 80 at its supported end 81, the end opposite that which carries the magnet, and the walls adjacent the bifurcation are tapered at 82 and 83. The outer walls taper inwardly and upwardly toward the upper end at 84 and 85.

Though the spring is at all times supported by the block 77 and its cap, the effective length of the spring is determined by an adjustable fulcrum in the form of a bar 86 having knife edge 87 extending across the spring. The bar 86 is movable transversely to the length of the knife edge, i. e., longitudinally of the spring.

It will be evident that with the taper at the outer end of the bifurcation and the outer edge taper at the upper end of the spring, movement of the knife edge lengthwise of the spring in Figure 1 will increase the width of the spring which is engaged by the knife edge and consequently will increase the width of spring which must be flexed in order to bend the spring.

The movement of the knife edge toward the connection with the diaphragm also shortens the leverage available for bending the spring by pressure through the diaphragm, hence, with lowering movement of the fulcrum in Figure 1, three elements, the progressive (inward) widening of that part of the spring section engaged near the middle of the width of the spring, the progressive (outward) widening of that part of the spring section engaged near the outer edge of the spring and the shortening of the leverage, will progressively reduce the distance to which the spring will be bent by any given pressure exerted through the diaphragm.

The complete range of movement of the magnet and hence of needle indicator or recorder movement for a given water level variation or pressure difference will be reduced progressively by inward movement of the fulcrum knife edge in Figure 1, or will be increased progressively by movement of the knife edge fulcrum outward in that figure. The fulcrum is shown in Figure 1 at its outermost position, corresponding with the longest range of movement of the magnet and greatest armature turning movement for a given pressure difference across the diaphragm.

The block carrying the knife edge fulcrum is slotted transversely at 88 from the back 89 so as to permit the block to be slid from the right in Figure 1, upon the barrel 90 of a spool 91 having flanges 92 and 93, when the spring is not in place.

The spool is rigid with a screw 94 which is threaded at 95 into the block or at 96 into the flange of the housing, or preferably into both of them, so that a slot 97 in the end of the screw may be accessible for turning to advance or retract the screw, and hence the spool, along the length of the spring. Access to the screw 94 is had through bore 98 within the flange, except as this bore is closed and leakage from within the housing is prevented by a set screw 99 which holds in place packing 100.

The flanges 92 and 93 hold the bar in position so as to place it at any desired position along the length of the spring and to hold it there.

During the travel of the slotted bar along the length of the spring, the back of the bar, i. e. the left end face of it in Figure 1, engages a disc 101 carried by a screw 102 which is threaded into the housing at 103 and can be advanced or retracted to move the disc 101 from or into a recess 104. The control of the screw 102 and the protection against leakage here are similar to those shown for the fulcrum screw.

Since the setting of the zero point of the indicator is dependent upon the position of the magnet to right or left in Figure 1, the zero point can be adjusted by advancing or retracting the disc 101 in that figure and correspondingly pushing the fulcrum edge against the spring or releasing it with respect thereto. The parts are shown corresponding to that zero position of the magnet farthest to the right in Figure 1.

A limit is set, to the extent of movement of the fulcrum edge along the length of the spring toward the lower part of Figure 1, by a set screw 105 which is engaged by the forward flange of the spool.

In assemblage, the spring-supporting block, range adjusting screw, zero adjusting screw, limit set screw and fulcrum block are placed in position before the spring with its magnet and other parts is fastened in place by the cap and the cap bolts. The diaphragm and diaphragm support are assembled and put in place, the housing being closed by the cover. The armature, well and associated parts are preferably put in place prior to closure of the cover to check the clearance between the magnet and the well.

The standard pressure and the variant, level-controlled pressure, or other opposing pressures are then applied.

By testing with maximum and minimum flow indicating pressures or other opposing pressure, the range of movement of the indicating needle or recording pen is found and the pen or needle is adjusted on the shaft of the spiral to conform to this range. Adjustment is made by advance or retraction of the fulcrum bar until the range between high and low level indicating is satisfactory. The zero point of the needle is then set by the zero-adjusting disc.

With the parts in place and the indicator range and zero point adjusted, the gauge is operated and any further calibration characteristic of a given installation is effected.

Where a standard pressure is used, the standard pressure is maintained by well known means. The predominance of the standard pressure on the right of the diaphragm over the variable pressures upon the left of diaphragm tends to bend the spring to the left in Figure 1 and hence shift the magnet to the left to varying extents depending upon the differential between the variant pressures due to different levels and the standard pressure or due to opposed pressures.

Some of the advantages claimed for the preferred form of my indicator over other indicators of similar purpose, and to greater or less degree true also of the other forms illustrated by me are as follows:

1. The indicator is mechanical in nature, providing rugged dependable response entirely independent of any supplementary actuating forces provided by such mediums as compressed air or electricity.

2. Although basically mechanical in construction, it is practically frictionless in operation, bearing pivots being restricted to two single point contacts within the pressure space and to two jeweled bearings outside of the pressure space.

3. There are no stuffing boxes or other pressure packed movable members projecting through the pressure wall. This eliminates the friction, leakage and other difficulties associated with such types of construction.

4. It is free from gauge glasses, thus eliminating gauge glass troubles and any danger from glass failure or accidental glass breakage.

5. In two of the forms illustrated, it is free from all indicating liquids such as mercury and other water insoluble liquids. Even in the third form it is free from disadvantages ordinarily associated with such liquids, such as accidental loss of liquid by gauge glass breakage or by blowing out of an indicator tube due to excessive pressure differentials, discoloration of indicating fluid by dirt particles, bleeding of contrasting colors into adjacent liquid medium, etc.

6. Adjustment to conform to the indication of a conventional type gauge can be effected while the indicator is connected and in operation.

7. One standardized instrument may, by adjustment, be calibrated to take care of a wide range of indication. This same adjustment may also be used to advantage to compensate for variations in indication due to varying density of liquid with pressure or to special conditions of individual passages. This adjustment may also be made while the indicator is in normal operation.

8. Indication is not limited by standard size of gauge glasses or pressure considerations. This permits the use of a clearly visible pointer moving over a liberally proportioned and well illuminated scale. If desired the scale may be colored and illumination may be external or internal. The effect of contrasting color mediums may also be reproduced if desired and, in absence of pressure restrictions, full and direct visibility at all angles may be obtained.

In Figure 1[a] a spring element is used of a different character from that seen in Figures 1–3. In this case a "sylphon" bellows 106 is seated in a recess 107 within the housing cover. The standard pressure is introduced within the "sylphon" element at 40, and the preponderance of standard pressure within the "sylphon" is transmitted through any suitable "sylphon" head 108 into engagement with a support for a magnet 48 by means of a pin 36′.

The magnet support may be itself a spring such as the spring 45, with or without the construction for fulcrum adjustment and for zero adjustment seen in Figure 1 or any other adjustment.

Permissibly the same train of transmission from the pin may be used, including thimble 44, as in the form of Figures 1, 2 and 3. With this possibility in view, the illustration has been modeled generally upon that of Figure 1.

In order to secure compactness, the "sylphon" element is shown as entering recess 21′ in a ring or disc 20′ corresponding generally to the diaphragm support 20 of Figure 1, though this element no longer performs the function of supporting a diaphragm.

The pin carries a collar 41′ corresponding generally to the collar 41 in Figure 1. This cooperates with a keeper 109 threaded into the ring 20′.

With indicator structure in conjunction with a calibrated orifice or a V notch flow meter to indicate flow, the resultant flow scale will not be in linear proportion, since the flow is not a straight line function of the pressure difference across the orifice nor of the water level above the weir. The indication may be made directly proportional to the flow for a given flow condition (or some such approximation to it which will lend itself to ready calibration) by compensating at the pressure-sensitive element of the indicator or at the magnetic transmission.

By the first step above, cooperation could be effected by variable restraint of the magnet movement, as, for example, by introducing a supplemental spring or supplemental springs.

By the second method above probably the simplest way to effect cooperation is by progressive variation of the pitch of the follower or armature to suit the characteristics of a given flow meter as discussed in connection with Figure 9.

In Figure 1[b] a structure is shown in diagrammatic form also paralleling that of Figure 1, with a spring 45′, which may have or may not have provision for adjustment of a fulcrum, and for zero adjustment, but which has one or more supplemental springs 110 attached to the spring 45′ at a selected point or points and attached at their opposite ends at 111 to any fixed structure such as the plate $20^2$.

By the construction in Figure 1[b] the effective component of force from the spring or springs 110 may be made to increase and greatly alter the total retarding effect of spring 45′ as compared with that of spring 45 against movement of the magnet and free end of the spring to the left. The remainder of the construction in Figure 1[b] showing transmission between a diaphragm and the spring 45′ is or may permissibly be the same as in Figure 1.

The operation of the spring or springs 110 may supply a considerable part of the retardation effect or may be supplemental merely to a flat spring of any suitable character.

Whatever the type of spring used, a single spring or a composite of two or more springs may be used such as the flat spring and a plurality of spiraled tension springs such as permissibly used in implementing the diagrammatic showing of Figure 1[b]. The character of spring action may be made to reduce an otherwise wide variation in indicator or recording pen movement for the same difference in pressure, thus bringing these distances within the range of calibration upon a normal scale or record.

Figure 5:
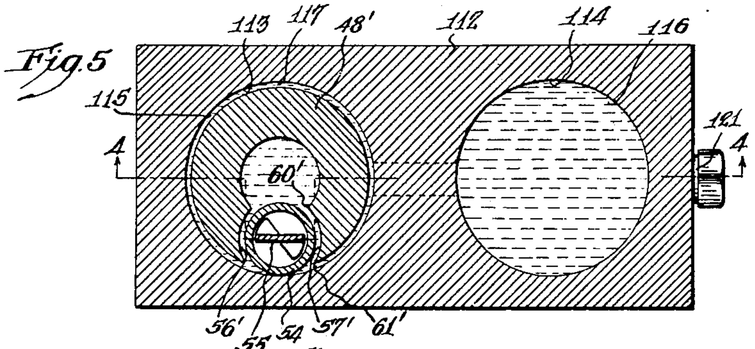
Figure 5 is a section of Figure 4, taken upon line 5—5 of Figure 4.
Figure 4:
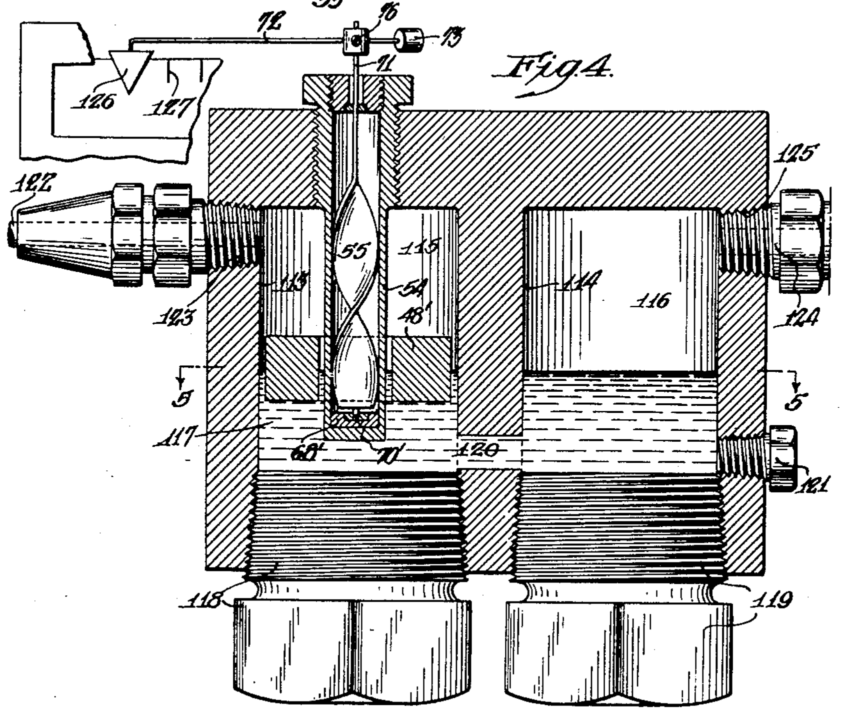
Figure 4 is a reduced scale central longitudinal section of a second form of indicator element of my invention, taken upon line 4—4 of Figure 5.

In the form of Figures 4 and 5, retardation by springs is wholly eliminated and such retardation as is used is restricted to the progressively increasing pressure of mercury opposing further change and tending to force the parts back to their initial position when increasing pressure upon the surface of a magnet 48′ resting in a mercury bath and upon the surface of the bath within which the magnet rests depresses this surface, raising the mercury in another part of the bath subject to a pressure. Here either the standard pressure or the variable pressure can be introduced in the magnet compartment by suitable change in the relation of level to armature, where a standard pressure is used. The illustration contemplates introducing standard pressure at the right.

In Figures 4 and 5, a casing 112 is bored at 113 and 114 to provide parallel compartments or chambers 115 and 116 adapted to hold a pool 117 of mercury. The ends of the bores are closed by threaded plugs 118 and 119.

In order that the mercury from one compartment or chamber may communicate with that in the other, the casing between the bores is transversely bored at 120 and the opening through which this transverse boring is effected is closed by a plug 121.

A variable pressure is admitted to bore 113 through pipe 122 and inlet 123 and a standard pressure or the higher of two variable pressures to be compared is admitted to bore 114 through pipe 124 and inlet 125.

The magnet 48′ floats upon the surface of the mercury in compartment or chamber 115 and in the absence of difference in section or irregularity of weight in parts of the magnet, the magnet will float level.

Because the magnet is free to move vertically, its upper and lower planes being parallel in all positions to the initial upper and lower planes of the magnet, and because friction of the magnet poles 56′, 57′ against the sides of a well 54 is not a serious matter when the magnet does not cant during its upward and downward movements, the clearance between the poles of the magnet and the walls of the well may be made less in such a construction than in the other figures and the edges 60', 61' of the pole pieces need not be altered nor trimmed.

With variation of one—and for an orifice flow meter it may be both—of the pressures to which the mercury bath is exposed in the two compartments or chambers, and with equal cross sectional areas in the two bores, the mercury bath in compartment 115 will rise or fall at the same time and to approximately the same extent as that in the other compartment will fall or rise. Difference of the cross sectional areas of the bores may be used to alter the range of indication for the same differences in the pressures in the two bores, reduction of the cross-sectional area of compartment 115, in which the magnet lies, with respect to that of compartment 116 increasing the lifting and lowering movement of the magnet and the angular movement of the indicator needle or recorder pen, for example, for the same difference in pressure. It follows of course that if the cross sectional area of mercury in compartment 116 be made selectively variable along the vertical length of the compartment, the resulting indication will be selectively variable with respect to the difference in pressure between the two compartments and may be made to conform to any variable function of the pressure such as flow through an orifice or over a weir.

The reverse is of course also true. This provides for adjustment of the scale range. Zero setting may be effected through set screws 76, or by withdrawal of plug 121 and insertion of mercury or withdrawal of mercury through the opening closed by plug 121.

The well and armature and their associated parts may be the same well and armature, etc. as seen in Figure 1. Though an indicator needle 72 is shown whose indicator target 126 moves over a scale 127, a recording pen and record may, of course, be used as in Figure 10.

Figures 6, 10:
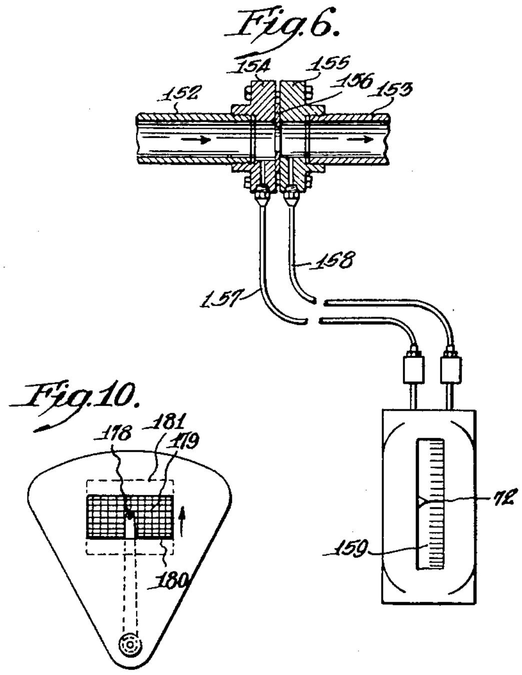
Figure 6 is a diagrammatic elevation, partly in section showing the invention applied to flowmeter measurement of a liquid passing through an orifice.
Figure 10 is a front elevation of a pen recording device operating on a travelling sheet by which any of the flow indicating structures can be made recorders.

In Figure 6 the flow pipe 152, 153 is interrupted to provide flanged terminals 154 and 155 bolted about an orifice plate 156. The flow pipe is tapped on opposite sides of the plate to pipe the pressures from opposite sides of the orifice to a gauge. Both of the pressures in the flow pipe form of Figure 6 fluctuate and the intermediate transmission of the indication or the interpretation—for example calibration—of the indicator must take into account the law of variation between the two pressures with different pressure values and different quantities of flow.

In Figure 6 the pipes 157 and 158 carrying the variant pressures on opposite sides of the orifice plate are connected with any gauge of the character described above, intended to operate by reason of opposed pressures with the higher pressure introduced at the right-hand side of the diaphragm, as in Figure 1. The indicator scale 159 is cylindrical.

Figure 7:
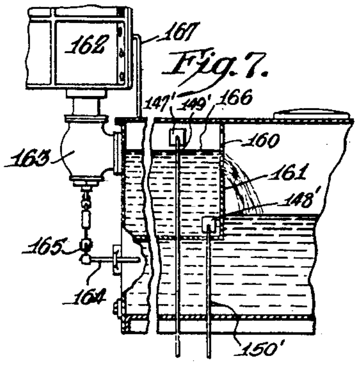
Figure 7 is a fragmentary elevation partly in section showing the invention applied to recording flow through a weir notch.
Figure 8:
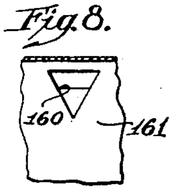
Figure 8 is a fragmentary front elevation of a V-notch weir such as could be used in Figure 7.

In Figure 7 the invention is applied to recording fluid flow or indicating merely the rate of flow of a liquid through a weir meter, a form of weir being shown at 160 in weir plate 161 in Figure 8.

The water in open feed water heater 162 passes through a valve 163 controlled by any storage space float, not shown, through a rocker shaft 164 and rocker arm 165 so as to control the supply of water from the heater entering above the weir and affecting water level 166. Steam pressure in the heater and meter are equalized by pipe 167.

The illustration in Figure 7 is modeled generally after the illustration in Figure 1 in Yarnall Patent No. 1,143,344 issued June 15, 1915, from which patent other mechanism normally associated with that shown in Figure 7 may be seen and its operation as well as that of the parts shown in Figure 7 may be checked and further explained. Other Yarnall patents to whose structures this invention may be applied are: 1,159,147 to 1,159,150; 1,178,463; 1,200,684; and 1,307,609.

In connection with the types of structure shown in these Yarnall patents, pressure spots 147', 148' are used to carry vapor space pressure as a standard, and variant pressure of the water which is above the weir, through pipes 149' and 150' to one of the gauges.

The differences in water level yield corresponding differences in pressure in pipe 150' but do not give a true indication of the quantity or rate of flow, since interpretation of water level into rate or quantity of flow involves application of the 5/2 power or other law of the weir, according to the shape of the weir selected.

In Figure 9 a corrective means is shown for producing a uniform or nearly uniform increase in rotation of the follower or armature due to variation in actual flow, where some such relation (law) as the 5/2 or 3/2 power obtains between liquid rate or quantity of flow and height over the weir. By this the movement of the indicator along the scale can be marked in uniform indicator distances of movement per unit of flow or can be nearly enough approximated to such uniform flow movement so as to bring any differences within easy calibration limits.

As previously indicated, the armature may be twisted to different pitches, uniform from end to end so that movement of the magnet for the intended distance will yield angular movement to an indicator or pen corresponding with the intended gauge extent of the scale.

The armature may also be spiraled irregularly, or according to any progressive rate of change (such as arithmetical or geometrical ratio, or a quadratic relation for example) to give an approximate straight line indication for rates or quantities of flow which do not bear a straight line relation to the variant liquid levels or pressures involved.

The spiraled magnetic follower or armature 55' in Figure 9 progressively reduces in pitch from the bottom of the well outwardly to the spindle or rod 71, whereby the same increments of movement of the magnet from the bottom of the well toward the top progressively increase in angular effect upon the armature according to the law under which the progressive shortening of the pitch has been determined. The follower or armature 55' may thus show variation in pitch according to the law of flow inherent in the character of measure used, or the armature may be twisted to compensate for deviation which would otherwise take place according to any irregular determination which may be found to give the desired correction in indicator record.

Where the departure of the needle from uniform rotation per unit of flow is slight enough to be within the range of calbration, the well may be of the same character as in the other figures. The question of whether or not a spiraled armature of suitable uniform pitch shall be used, such as seen in Figure 1, or a spiraled armature of progressively changing pitch, such as that in Figure 9 becomes a question of policy, in view of the amount of departure of the movement to be indicated from uniform movement per unit of change and the adequacy of calibration to take care of this difference.

With an orifice flow the law of relation of pressure difference to flow is the square root law. As a result, the progressive change in pitch of the armature will be the reverse of that shown in Figure 9, though not in the same proportion. The closer pitches will be at the right.

The movement of the magnet transversely along the length of the armature to secure the desired coupling can be effected by hand, whether the well intervene or not.

Figure 10 is intended for the purpose of showing that an arm suitable for an indicator, such as 72, can carry a recording pen 178 and travel across a moving record disc or moving record strip such as the record surface 179 fed from one mounting roll 180 to another at 181.

The operation in all of the forms has much in common, namely, that the movement of the magnetic flux transversely to the lines of flux and lengthwise of the follower or armature disturbs the relation between the follower or armature and the magnet, in the previous position of the magnet in which the armature rests in position of minimum reluctance to the flux, and causes the armature to rotate sufficiently for the relation of maximum flux to be re-established.

The extent of rotation required to again establish minimum reluctance depends upon the extent of movement of the magnet causing the flux and upon the pitch of the follower or armature.

It will be evident that the extent of variation in range by adjustment of the fulcrum is within the control of the designer, who can vary the effect by the extent of taper of the spring at different points, for example.

It will be evident that all of the structures illustrated are simple, of low first cost and low cost for repairs. Assembly and external adjustment of the zero point and range are easy and when adjustment has been made the conditions are stable. The spring affords combined spring transmission and entire magnet support and makes available more suitable spring material than is otherwise available. It also eliminates difficulties associated normally with the use of mercury or other auxiliary liquids.

The several ways of adjusting for zero point and for range are not inconsistent but may be used together, one type of adjustment for major adjustment and other to secure additional adjustment.

It will be evident that the magnetic alignment of an armature with respect to the flux of the magnet, passing freely through the non-magnetic walls of the well, affords a simple, effective and reliable resilient coupling between the magnet and the armature, at whatever position the magnet may assume along the length of the armature and at the same time frees the armature wholly from pressure conditions, without regard to the extent of pressure within the chamber traversed by the magnet and whether the magnetic flux be shifted parallel to the axis of the follower or armature or only generally along the length of the follower or armature.

Since the difference between the indicator and the recorder does not require more change in structure than the use of a recorder pen upon a travelling record instead of an indicator arrow and since the record to be made is merely a continuous indication, I have aimed to use the word "indicator" here to cover both forms and to apply whether a visual indication only is given or a record is made.

Whatever the form of structure used by which to turn the spiral armature by movement of a magnet along the length of the armature axis, I provide a path of magnetic flux across the armature of a width normal to the axis of the spiral and in width approaching the diameter of the spiral, in order that the body of the magnetic flux may not only traverse the metal of the cross section of the spiral presented at the middle of the poles but that there may be magnetic flux outside of this metal of the spiral on both sides of it and toward the respective ends of the spiral, presenting magnetic moments on opposite sides of the magnetic center line, the one tending to turn the spiral in clockwise direction and the other tending to turn the spiral in counterclockwise direction.

Contrary to the usual cases typical of the structures previously known, where pole pieces of small dimension with respect to the spiral armature cause alignment of a narrow portion of the included spiral essentially along the straight line path of the flux between the poles, the present inventio nutilizes poles of much greater width and breadth, so as to include the width of the armature and an axial length of the armature approximately equivalent to one-fourth of the spiral pitch within the magnetic field, and preferably in the range between one-eighth and one-quarter pitch, but permissibly in the range between one-eighth and three-eighths pitch.

The length of spiral influenced by the magnet flux may be greater or less than one-quarter pitch length of spiral but optimum performance will not then be realized.

The larger area and the location of the pole permit not only alignment of the center portion of the armature with the flux as in other devices but also include a spiral section on each side of the center line which is subjected to opposite magnetic torques since the spiral sections at the faces of the magnet will be at an angle of about 45° with the flux line if the one-fourth pitch relation is used.

Practical operation of the indicator requires a strong, compact, independent source of magnetic flux to bridge the gap occasioned by the pressure wall and by the necessary clearances between the magnetic poles and the spiral armature. This calls for a permanent magnet of efficient magnetic material and a magnetic circuit of minimum reluctance. A horseshoe type magnet satisfies the latter requirement.

Oppositely disposed bar magnets would not provide a magnetic return path of low reluctance for the flux and the flux density across the gap for the same magnetic weight would only be a fraction of that provided by the horseshoe type. Such a structure utilizing the best known magnetic materials would be too inefficient for practical operation of the indicator.

If a low reluctance path be provided for two oppositely disposed bar magnets, the resulting structure would in effect constitute a composite horseshoe type magnet.

Electromagnets, although theoretically applicable, are ruled out because of objection to dependence on an outside source of energy. The practical difficulty of conveying current to and from a movable magnetic coil immersed in a conducting liquid and contained in a pressure vessel makes this form additionally objectionable.

Sensitivity considerations require that the flux emanating from the poles remain as fixed as possible with respect to the poles so as to cause total armature response and minimum tendency for shifting of the flux concentration on the pole pieces or faces to accommodate slight positional changes. The magnetically soft cores customarily used with electromagnets do not appear to satisfy optimum requirements in this respect.

The complete magnetic circuit is shown in a horseshoe type of permanent magnet which may be referred to as an open ring type permanent magnet or as a permanent magnet having opposite holes directed toward each other. The open ring shown is a ring in which the circuit has been interrupted by removing a portion of the material which would otherwise be required to complete the ring, which has been magnetized and in which under the conditions given the ends of the otherwise complete ring structure present themselves as oppositely facing poles.

The magnetic screw is in itself old. It is shown, for example, in Norwegian Patent No. 46,537; German Patent No. 515,342 and in U. S. Patent No. 2,154,678.

The distinctions and the reasons for the distinctions of the present invention from such structures will be clear from the following discussion.

Armature response in the patents above in general results from the continuous alignment of a narrow cross sectional band of spiral armature with longitudinal movement of a transversely directed field of magnetic flux. Maximum sensitivity of operation for this condition requires minimum clearance between magnetic armature and poles or pole pieces conforming to the adjacent section of the spiral precisely as indicated in the illustrations. If the gap between the armature and magnetic poles be increased, the reluctance of the magnetic circuit is increased, the flux is decreased, and a loss of torque and sensitivity results. Interposition of a pressure wall and necessary clearances between poles and armature as applied to the present case would necessarily increase the gap and consequently would result in the lowering of the level of performance of the structures of these patents.

In the present case a comparatively long section of the spiral armature (approximately one-fourth pitch) is contained within the gap between broad poles of a strong "Alnico" magnet (the most efficient commercial permanent magnet material available to date). The flux is not guided or directed to the opposite edges of the included armature as in the patents, but streams across the gap and acts upon the entire included spiral of approximately one-fourth pitch length. The spiral section at the magnetic centerline of the poles is aligned directly across the poles and in this respect behaves similarly to the patent structures. A 45° twist of the spiral on each side of the center line is also in the magnetic field and the spiral armature is thereby subjected to equal and opposite turning moments. The relation of magnetic pole width to spiral pitch is selected by me so as to provide maximum or near maximum opposed turning moments in the planes corresponding to the sides of the magnet along the axis of the spiral armature, for this condition causes maximum unbalance for an increment of movement and provides the amplitude of restoring torque and sensitivity necessary to fulfill requirements of the present case.

In Figures 11—11$^a$, 12—12$^a$, 13—13$^a$ and 14—14$^a$, a previously existing form of magnet poles operating upon a twisted spiral between them is shown. As is usual in such cases, the magnet poles are both short in extent along the axis and thin, i. e. they not only do not extend far along the armature axis but they do not extend far about the armature. The pole areas are thus not only circumferentially small and small in their axial extent but are small in their total areas. They concentrate the flux upon that intermediate portion of the spiral armature which is immediately adjacent at the middle of the poles. As a result they give substantially a straight line flux path from one pole to the other through the included section of the armature.

For comparative purposes, unit effective magnetic pole area is assumed and the magnetic force is assumed to be unity at minimum gap distance. In the equilibrium position of the armature, the moment arm of the magnetic force is zero, the spiral section being in alignment with the flux. The torque is of course also zero.

In Figures 11 and 11$^a$ it will be seen that the poles 182, 183 have a total width substantially equal to the thickness of the strip 184 from which the armature is spiraled. The gap indicated has been made excessive so as to accommodate an intervening pressure well, as would have to be the case if this form is to be compared with that of the present invention. The length of the pole pieces parallel to the armature axis from points 185 to point 186 is trivial as compared with the pitch of the spiraled armature. The volume of the flux or the cross section of the flux, as it may be considered, is very small as compared with the section of the spiraled armature through which the flux distributes.

The structure of Figures 11 and 11$^a$ is best suited to conditions where the poles can be brought close up to the intervening spiraled armature and where the entire flux can be concentrated for this reason upon a short section of armature. As will later be pointed out, it is not well suited to a construction where the armature is surrounded by a protective well which makes it necessary to space poles from the spiraled armature to such an extent that the magnetic flux cannot be concentrated upon the armature. In such a case as that in Figures 15 and 15$^a$, the structure of Figures 11 and 11$^a$ would be inadequate for the purpose.

In Figure 12 the magnetic force for equilibrium corresponding to Figures 11 and 11$^a$ is shown. The magnetic force is given per unit effective pole area. The magnetic force exerted is represented by the figure 187 in the maximum position when the armature is aligned with the flux. The curve in Figure 12$^a$ indicates the effective force exerted by the pole pieces upon the armature with movement of the poles along the axis of the armature a distance equal to one-fourth of the spiral pitch.

Figures 14, 14A, 15, 15A, 16, 16A:
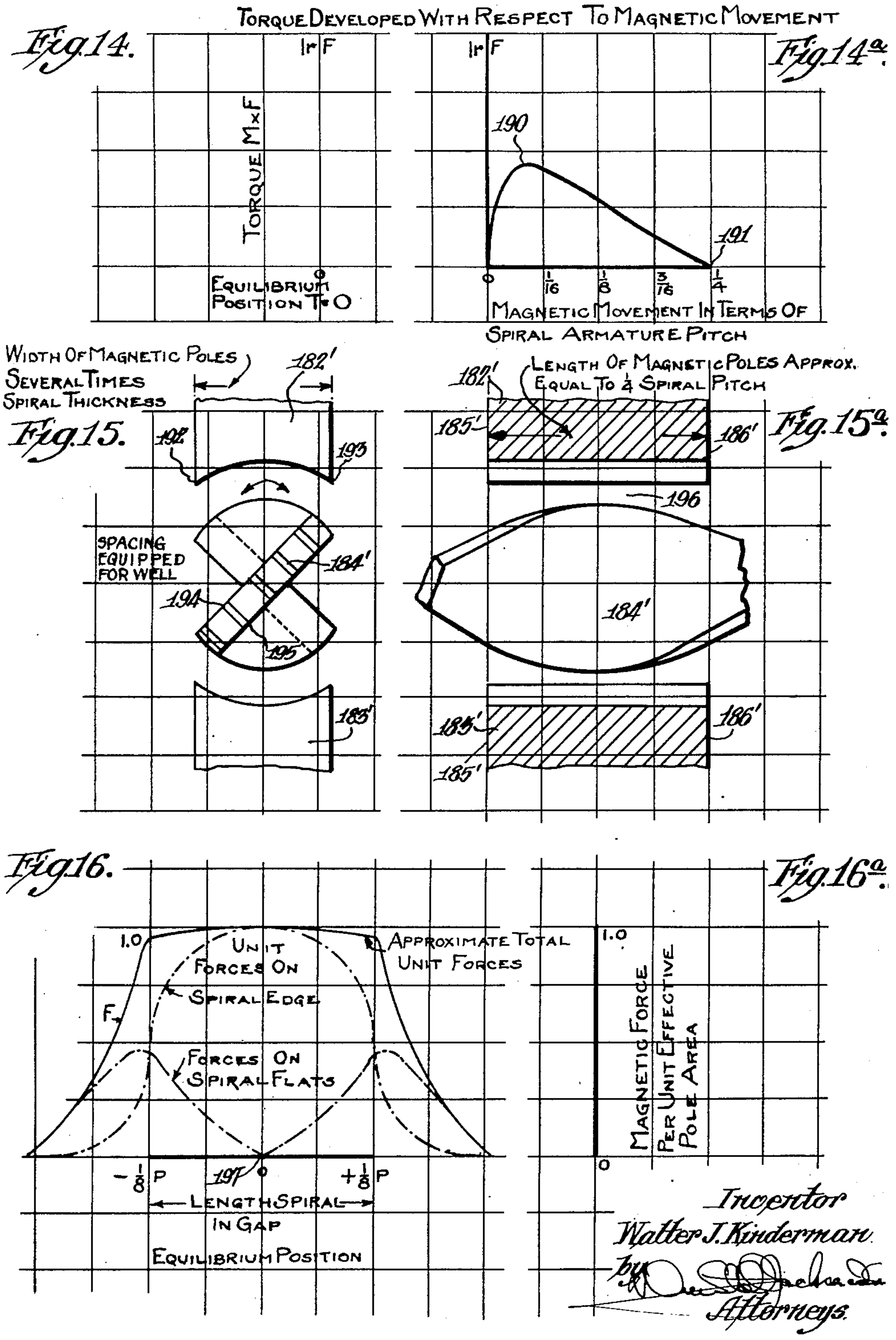

In Figures 13 and 13$^a$ the moment arm of the flux acting upon the spiral armature is indicated as reaching a maximum when equal to $r$ the radius of the spiral, shown at 188. The moment arm of the flux tending to turn the spiraled armature about its axis is zero when the transverse section of the armature is in alignment with the flux. As the magnet is moved along the spiraled armature the moment arm increases, reaching a maximum at some such point as 189 at a distance corresponding to somewhatover one-eighth of the spiral pitch distance. The torque exerted upon the spiral armature tending to turn it about its axis under the conditions in the figures above is represented in Figures 14 and 14$^a$. This is a product of the magnetic forces and the moment arm. The position of Figure 14 is equilibrium position, in which the torque is zero and there is no tendency to turn the spiral armature.

As the magnet is moved along the axial length of the spiral arm, the torque increases rapidly, reaching its maximum at some such point as 190, at somewhat over one-thirty-second of the spiral pitch, and gradually decreasing to a minimum again at, let us say, 191, approximately one-fourth of the spiral pitch.

Sensitivity of response of the armature to longitudinal magnet movement is a function of the restoring torque with relative displacement from the equilibrium position. In the case of Figure 12, the magnetic force increases from assumed unity per unit of area with relative displacement of magnet and armature and the moment arm decreases from zero with this progressive displacement, as shown in Figure 13. The resulting form of the torque curve with respect to change of relative position of magnet and armature is as shown on Figure 14. It will be noted that the maximum restoring moment is developed for a magnet movement of slightly over one-thirty-second of the spiral pitch distance.

In Figures 15 to 19, $15^a$ and $16^a$ inclusive, the schematic views shown apply to the present form of the invention as distinguished from the prior art type discussed in connection with Figures 11, $11^a$; 12, $12^a$; 13, $13^a$ and 14, $14^a$.

In the present invention the thickness of the pole pieces from 192 to 193 preferably is several times the thickness from 194 to 195 of the strip material from which the spiral armature of magnetizable material is constructed (as this exists in the prior art of Figure 11, for example), and my best results have been obtained when the chord distance approaches the diameter of the armature. This gives a much wider band of flux across throughout the depth or height of the magnet pole pieces 182′ and 183′.

The extent of the pole pieces from 185′ to 186′ parallel to the axis of the armature is also many times the extent in the prior art form from 185 to 186 (see Figure $11^a$) and my best results have been attained when the pole pieces approximate one-fourth of the pitch of the spiral armature 184′.

Between the spiral armature and the pole pieces there is space at 196 for the stationary pressure shield, within which space the armature rotates and outside of which the pole pieces move parallel to the axis of the armature. These general relations are shown in Figures 15 and $15^a$.

The illustrations in Figures 15, $15^a$; 16, $16^a$; 17; 18 and 19, which schematically show the present invention, form a basis for contrast with the prior art form of the immediately preceding schematic figures. Of these figures, Figures 15 and $15^a$ show the contrast between the wider pole pieces, extending farther along the armature axis, of the present invention and the pole pieces of small dimension in both directions and of small cross section in Figures 11 and $11^a$.

Figures 15, $15^a$ yield a wide range of variant magnetic forces and movements effective on the spiral section included in the magnetic field of large cross section provided by the present invention.

Assuming, as before, that unit effective magnetic force per unit area obtains for minimum gap distance, we find this unit force acting on the edge of the spiral to be maximum at the magnetic centerline and reducing toward the magnet sides because of increasing gap and decreasing projected armature areas between the spiral edge and the centerline, the spiral edges acting farther and farther away from the pole faces as the distance along the axis increases on opposite sides of the centerline.

Figures 16 and $16^a$ show the relative magnitude of these magnetic forces and the approximate totals at the various spiral sections within the magnetic gap. The moment arm of these respective total forces is zero at 197 at the centerline of the magnet (Figure 17) and increases in opposite directions on each side of the centerline as there shown.

The moment arm reaches a maximum at the limits 198 and 199 at each side of the magnet as shown in Figure 17. The resulting torque, which is the product of the total forces and corresponding moment arms at the respective sections, increases in opposite directions at each side of the magnetic centerline and reaches a maximum at the pole limits as indicated at 200 and 201 in Figure 18. The spiral assumes a balanced position of equalization of opposed moments which corresponds to the position of lowest reluctance of the magnetic circuit.

In the entire operation described, it makes no difference which be the leading and which the trailing edge of the pole pieces nor, correspondingly, does it matter whether the magnet is moving upwardly or downwardly, the character of operation of the armature by the magnetic forces set up being the same.

In the case of Figures 15 and $15^a$, axial magnetic movement of the magnetic poles with respect to the spiral armature adds to the existing torque on one side of the magnetic centerline and subtracts from the existing torque on the other side, at or near the maximum obtainable rate.

Although the torque per unit magnetic force per unit area may be comparable for the prior art discussed in connection with Figures 11 to 14 or even less in the present invention, the larger effective pole and armature areas of the present invention provide for much larger total magnetic restoring moments. It will be noted that the initial rate of increase in the restoring torque with relative displacement of the armature and the magnet is high and likewise contributes to sensitivity of response.

The curves of Figure 18 illustrate the development of this greater restoring torque. The left hand curve 202 shows the relative torque values developed in the spiral armature within the magnetic gap. It will be noted that the torque is zero at the magnetic centerline 203 and increases equally in opposite directions to a maximum at 200 and 201. It will thus be evident a distinct advantage exists in having the axial extent of the magnet pole piece the greater part of a quarter of the pitch distance.

The restoring torque comparable to that in Figures 11 to 14 may be obtained by totalling the unbalancing moments per unit edge area of spiral with respect to magnetic movement. This can be done graphically by dividing the spiral length in the magnetic gap into increments 204 of length corresponding to the assumed unit length of the magnet represented in Figures 11 and $11^a$ and adding the mean torque values of these increments as they become unbalanced moments with respect to magnet movement.

To illustrate the above, take the case of magnet movement corresponding to one unit l of length in Figure 18 which, for the relations shown, corresponds to one-thirty-second of the distance of the spiral pitch. A positive torque loss of $t_1$ results from this movement, accompanied by a simultaneous gain in negative torque $t_2$ of approximately the same magnitude. The net relative restoring torque for this magnet movement would be $t_1+t_2$. This point is plotted on the torque vs. magnet-movement curve for the movement of one-thirty-second of the spiral pitch distance (as shown by Figure 19). Further magnet movement develops additional restoring torque as indicated by the completed curve of the same figure.

It will be noted that the maximum restoring moment occurs at a magnet movement equal to one eighth of the spiral pitch from the equilibrium position. This is advantageous in that it provides latitude of positive armature control and response for rapidly changing magnet positions as compared with the comparable cases in Figure 14.

The utilization of the magnet poles of relatively large size with respect to spiral armature dimensions of the present case contributes important advantages aside from the foregoing distinctions. It permits retention of higher unit magnetic forces and provides greater assurance of permanency of magnetic properties over the life of the instrument. These advantages further amplify the improved performance over that of the patent structures and in themselves provide the practical elements which stimulate commercial acceptance of a device. The form of the magnet used furthermore conforms to simple design and efficient proportioning of magnet material. This in turn implies low cost of manufacture commensurate with high level of performance.

A more detailed mathematical analysis of forces and moments can be prepared if it be desirable to distinguish the present invention from the structures shown and described in the Norwegian and German patents and in the patent to Hawthorne and Campbell previously referred to. However, the effectiveness of such an analysis must depend upon recognition of the basic differences indicated herein.

It would seem to be clear that the differences between the operation of the structure of these prior patents and the operation of the present invention is a radical difference necessary for operation where there is to be a large gap to provide for a pressure protective well and is a difference in kind and not a mere difference in degree. The structures of the type shown in the Norwegian and German patents or in Hawthorne above would be inoperative for my purpose and could not be made operative without the radical change in character of the flux field represented by the present invention.

One noticeable difference between the structure and method of Figure 11 and that of Figure 15 lies in the means by which balance is secured.

In Figure 11, the armature is held in position of equilibrium by the magnetic force represented by a pull of force *a* directing the armature section shown toward pole 182 and the magnetic force *b* directing the armature toward the pole 183. The pull of force, *a* and *b* whose lever arm is zero in position of equilibrium increases with rotating movement of the armature to become *a'* and *b'* when the armature is rotated to the position shown in dot and dash.

On the other hand, remembering that in Figure 20 the section (pitch quadrant) of the spiral length at any time lying between the poles has strip edge ends 205 and 206 toward the observer at one end of the pitch quadrant being considered, and at 90° from these facing ends has edge ends 207 and 208 away from the observer, there are two pairs of forces both acting on lever arms at the same time, namely *c* and *d*, both acting upon the edge ends of the armature facing the observer and both tending to rotate the armature in counter-clockwise direction by the pull exerted on these ends by the portions 209 and 210 of the magnet poles. This forms one pair or couple of magnetic forces.

At the opposite edge ends 207, 208 of the quadrant section of the armature are located two magnet moments *e* and *f* operating between the edge ends 207 and 208 and the portions 211, 212 of the magnet, both tending to pull the more nearly adjacent edge ends toward the corresponding part of the magnet, forming a second pair or couple which tends to rotate the armature in a clockwise direction.

Both of these pairs of magnet moments operate on lever arms, which are not zero in the position of equilibrium in Figure 20—thus contrasting with Figure 11. In this position of equilibrium the lever arms approach one-half of the diameter of the spiral.

There are, therefore, two pairs of balanced magnetic moments in Figure 20, both of which operate with maximal lever arms and with their torques opposing each other. Each movement of the magnet from equilibrium increases the torque of one pair and reduces the torque of the other pair, the addition and reduction taking place at the points of greatest leverage. Let us consider for the moment that the movement reduces the force acting upon the nearer end, i. e., reduces the forces *c* and *d* tending to rotate in counter-clockwise direction and increases forces *e* and *f* tending to rotate in clockwise direction. The clockwise forces will overcome the counter-clockwise forces and the armature will turn until they equalize.

It should not be inferred from the distinctions drawn that the patent structures are not properly operative in their own fields. If the magnetic gap of Figures 11 and 11ª is reduced to about one-tenth of that shown, which brings the structure in approximate relation to the proportions of the patent structures, the flux is increased ten times and the magnetic moment arm for a given displacement is increased in approximately the same order. This will without question result in good operation, even with far less efficient magnet materials than are applied in the present case. This same case which illustrates the rate of increase of torque with reduction in the gap demonstrates the unavoidably high loss of torque with increase in the gap to accommodate the pressure wall of the present case. This in turn emphasizes that the patent structures were intended for applications involving close clearances between armatures and magnet poles and are inadequate if attempt be made to apply them to the present case.

In summary, the following distinctions may be drawn: the patent structures operate by positioning of the armature to a balance at essentially zero value of opposed magnetic moments. The present case operates by positioning of the armature to a balance at maximum equal and opposed magnetic moments. In other words, the patent structures operate by the setting up of restoring torque forces starting from zero and the present case operates by restoring torque caused by unbalancing of opposed magnetic moments (at or near the maximum obtainable rate) with respect to change in positional relationship of the magnet and the armature.

Stated in still other terms, the patent structures are operated by the development of a pair of magnetic moments with relative displacement of the magnet and the armature from the balanced position, while the present case is operated by the additive unbalance of two respective pairs of opposed magnetic moments with displacement of the magnet and the armature from a balanced position.

The patent structures utilize poles or pole pieces of restricted area to effect conformation of the flux path to the effective armature section of spiral. The present case utilizes large poles, which secure excellent results when they approach the diameter of the spiral in one direction and when they extend over approximately one-quarter of the spiral pitch distance in the other, producing a correspondingly strong magnetic field, effective over a comparatively large area and providing a large margin of magnetic response necessary to meet the practical requirements of the case.

Again the patent structures operate by diametral alignment of a spiral section with the flux, while the present case operates by axial equalization of moments acting on the projected spiral area within the magnetic gap.

The present case provides for much greater restoring torque over a wider range of magnet movement than that provided by the otherwise corresponding structure of the patents. The larger magnet provides for higher overall magnetic strength per unit pole area, and a higher degree of permanency of magnetic properties and lends itself to simple, economical and practical design.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a flow meter having a space in which liquid flow occurs provided with walls including an orifice in the path of the flow, having a movable wall and having conduit connections from points on either side of the orifice to points on either side of the movable wall for causing movement of the wall in response to pressure, magnetic flux producing means moved along a range of longitudinal movement by the movable wall in response to the differential pressure from the opposite sides of the orifice, a spiraled armature of magnetic material having a variable pitch positioned in the flux path and extending along the path of movement of the magnetic flux producing means, the variation in pitch of the spiral correcting the non-linear character of the relationship between flow and motion of the flux producing means, bearing means pivotally supporting the armature to rotate about its longitudinal axis and an indicator mounted on the armature for indicating the angular position of the armature.

2. In a flow meter having a space in which liquid flow occurs provided with walls including an orifice in the path of the flow, having a movable wall and having conduit connections from points on either side of the orifice to points on either side of the movable wall for causing movement of the wall in response to pressure, magnetic flux producing means moved along a range of longitudinal movement by the movable wall in response to the differential pressure from the opposite sides of the orifice, a spiraled armature of magnetic material having a variable pitch positioned in the flux path and extending along the path of movement of the magnetic flux producing means, the variation in pitch of the spiral correcting the nonlinear character of the relationship between flow and motion of the flux producing means, bearing means pivotally supporting the armature to rotate about its longitudinally axis, a pressure wall surrounding the armature and betwen the armature and the flux producing means, and an indicator mounted on the armature.

3. In a flow meter having a pressure responsive member which responds to pressure developed by reason of flow, a horseshoe magnet connected to the pressure responsive member and moved by reason of the pressure applied to the member and in a nonlinear relation to the flow, a magnet support retarding movement of the magnet, walls forming a chamber within which the horseshoe magnet moves and including a nonmagnetic armature well extending between the poles of the magnet, and extending along the path of movement of the magnet, a magnetizable spiral armature mounted for rotation about its longitudinal axis within the well, the spiral differing from uniform pitch in accordance with a nonuniform relationship between pressure and flow to promote uniform rotation proportional to the rate of flow, and means for indicating the angular extent of rotation of the armature.

WALTER J. KINDERMAN.

REFERENCES CITED

The following references are of record in the file of this patent:

UNITED STATES PATENTS

| Number | Name | Date |
|---|---|---|
| 1,277,371 | Boyle et al. | Sept. 3, 1918 |
| 1,363,139 | Mason | Dec. 21, 1920 |
| 1,577,909 | Kath | Mar. 23, 1926 |
| 1,710,474 | Dodd | Apr. 23, 1929 |
| 1,983,231 | Keitel | Dec. 4, 1934 |
| 2,096,032 | Engel | Oct. 19, 1937 |
| 2,127,501 | Dall | Aug. 23, 1938 |
| 2,154,678 | Hawthorne | Apr. 18, 1939 |
| 2,182,469 | Davis | Dec. 5, 1939 |
| 2,371,511 | Faus | Mar. 13, 1945 |

FOREIGN PATENTS

| Number | Country | Date |
|---|---|---|
| 62,163 | Switzerland | Aug. 20, 1912 |
| 46,537 | Norway | June 3, 1929 |
| 515,342 | Germany | Jan. 2, 1931 |